April 19, 1966 R. E. FINLAY 3,246,555

TOOL HUB

Filed Sept. 28, 1964

INVENTOR.
ROBERT E. FINLAY
BY
Barlow & Barlow
ATTORNEYS 3,246,555
TOOL HUB
Robert E. Finlay, Warwick, R.I., assignor to Rite-Size Corrugated Machinery Co., a corporation of Rhode Island
Filed Sept. 28, 1964, Ser. No. 399,719
2 Claims. (Cl. 83—665)

This invention relates to the hub of a circular cutting tool such for example as a knife used in the making of boxes which requires adjustment along an arbor which drives the tool.

Tools of this general character have heretofore existed in which the hub was formed in two separate semi-circular parts which were held in circular alignment by tongue and groove arrangements and bolts a plurality of which needed to be loosened in order to adjust the cutter along the arbor.

One of the objects of the invention is to provide a hub for a cutter which will be simplified with reference to what has heretofore been the practice.

Another object of this invention is to provide a hub for a cutter in which they may be utilized a single bolt at each side of the hub to effectively act as an aligning pin and also as a means for holding the hub together.

Another object of this invention is to provide an arrangement so that only a single bolt need be loosened for adjustment of the cutter along its arbor.

With these and other objects in view, the invention consists of certain novel features of construction as will be more fully described and particularly pointed out in the appended claims.

With reference to the drawings, 10 designates an arbor upon which a cutter designated generally 11 is mounted. This cutter comprises a disc-like member 12 and a hub portion 14, which hub portion is more particularly the subject of this invention.

Figures 1, 2:
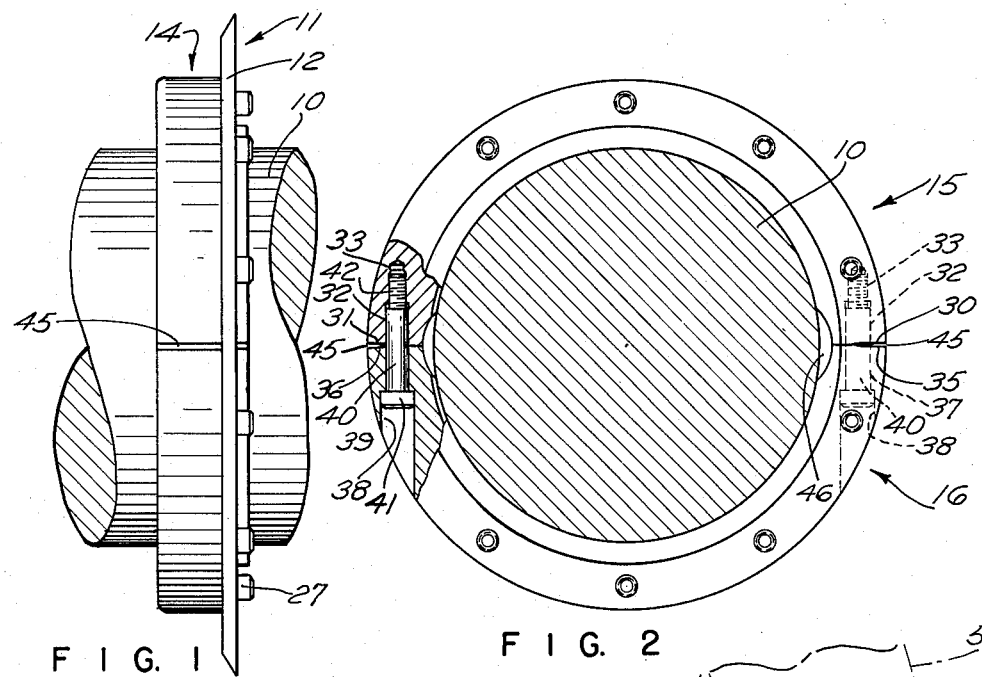
FIG. 1 is an edge elevation of the cutter and hub shown as mounted upon an arbor which is fragmentally shown.
FIG. 2 is a front elevation of the hub with parts in section, the arbor shown in section and with the cutter omitted.

The hub consists of a first part 15 and a second part 16 each of semi-circular form which when arranged with the ends thereof in abutting relationship, such as shown in FIG. 2, provides substantially a complete circle, which will be of a size to grip the arbor 10 and hold a cutter mounted upon the hub in position thereon.

Figure 3:
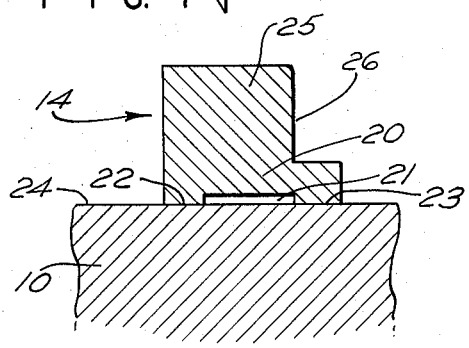
FIG. 3 is a sectional view through the hub with the cutter omitted and a fragmental portion of the arbor.

As shown in cross-section FIG. 3, the hub has a base portion 20 recessed at 21 so as to provide spaced lands 22 and 23 for engagement with the peripheral surface 24 of the arbor 10, thus preventing rocking out of its intended plane relative to the arbor when in engagement therewith. A radially extending portion 25 of an axial extent less than the similar dimension of the base provides a recess 26 for receiving the disc-like cutter member 12 which may be bolted to this radial portion 25 by bolts 27 arranged circularly about the assembled parts of the hub.

Each of the ends 30 and 31 of part 15 are provided with a stepped bore of a first diameter 32 and a smaller diameter 33, which latter portion is threaded. The end portions 35, 36 of the part 16 which mate with the ends 30 and 31 each have a bore 37 with a countersunk portion 38 extending from the end outwardly through the periphery of the part 16 thus providing a shoulder 39 between these bores. The bores 32, 37 in the parts 15, 16 are in axial alignment and are of the same diameter to closely receive bolts 40 which are of substantially the same diameter as these bores so that when such bolts are in position they will serve to align two parts of the hub. The bolts 40 are provided with heads 41 of a size larger than the diameter of the bolt to engage the shoulder 39 and are threaded on a smaller diameter as at 42 at its other end so as to engage the threaded bore 33. Thus, when the bolts are turned to draw the parts together, they will serve to align the parts as well as to clamp them upon the arbor 10.

The mating ends 31 and 36 and 30 and 35 of the parts 15 and 16 are so arranged as to provide contact radially inward from the center line of the bores of the inner surface of the hub. From the center line of the bores radially outward of the hub, the ends are chamfered to provide a space 45 between the ends. It might further be pointed out that the inner surface of the hub is recessed at each of the ends as at 46 so as to provide clearance from the arbor for a purpose to be described.

Figure 4:
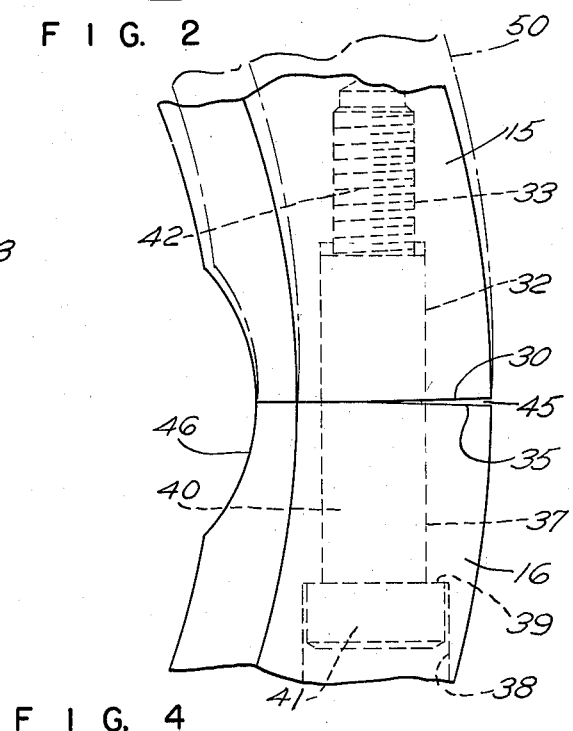
FIG. 4 is a greatly enlarged view illustrating in dotted lines the movement of the hub when one of the bolts is loosened.

Assuming that the hub is tightly squeezed upon the arbor so as to hold the cutter in position, it is desired to adjust the cutter to a different axial point on the arbor, it is merely necessary to loosen one of the bolts. Thus, for instance, if the bolt 40 on the left hand edge of the hub as shown in FIG. 2 is loosened, the hub will by reason of the chamfered portions at the right hand side of the hub rock about the mid line of the bores 32, 37 and move from the full line position as shown in FIG. 4 to the dotted line position 50. This pivotal action occurs without the need for loosening the bolt 40 on this side of the hub. Thus by simply loosening one bolt of the hub, it will expand sufficiently for adjustment along the arbor 10. Further, the recess 46 permits slight relative inward movement of the radially inner edge of the ends at the right hand side portion of the hub in the above assumed operation. This whole operation is not impeded by the close fit between bolt 40 and its receiving bores, as to achieve a sliding fit a two thousandths tolerance has been provided. Geometrically it can be proven that great magnification of diametric dimension is possible with only two thousandths movement at the bores.

I claim:

1. A tool hub comprising separate semi-circular parts having their ends adjacent to embrace an arbor upon which the tool is to be positioned, a first of said parts having a stepped bore extending inwardly from its end surface with a threaded terminal portion and the other of said parts having a bore with a countersunk portion to form a shoulder, said first and second named bores being in register, a bolt extending through said bores having a head engaging said shoulder and a threaded end engaging the threads of said stepped bore for drawing said parts together, the end surfaces of said parts touching from the center of the bolt to the radially inner edge of the parts and spaced from the center of the bolt to the radially outer edge of the hub.

2. A tool hub comprising separate semi-circular parts having their ends adjacent to embrace an arbor upon which the tool is to be positioned, a first of said parts having a bore extending inwardly from its end surface with a threaded terminal portion and the second of said parts having a bore, said first and second named bores being in register, a bolt extending through said bores having a head engaging said portions about the bore of the second of said parts and a threaded end engaging the threads of said bore of the first part for drawing said parts together, the end surfaces of said parts touching from the center of the bolt to the radially inner edge of the parts and spaced from the center of the bolt to the radially outer edge of the hub.

References Cited by the Examiner

UNITED STATES PATENTS

| | | | |
|---|---|---|---|
| 1,542,879 | 6/1925 | Hires | 83—663 |
| 1,622,265 | 3/1927 | Ackermann et al. | 83—665 X |
| 2,216,208 | 10/1940 | Michon | 83—699 X |
| 2,377,130 | 5/1945 | Cohen | 83—665 |
| 2,652,297 | 9/1953 | Stears et al. | 287—127 X |
| 2,666,485 | 1/1954 | Antosh | 83—675 X |
| 3,106,859 | 10/1963 | Huffman | 83—670 X |

WILLIAM W. DYER, JR., *Primary Examiner.*